United States Patent [19]

Nakamura

[11] 4,110,844
[45] Aug. 29, 1978

[54] VENT TYPE EXTRUDER

[76] Inventor: Kensaku Nakamura, 272-1, Bessho-Cho, Matsubara-Shi, Osaka, Japan, 580

[21] Appl. No.: 797,388

[22] Filed: May 16, 1977

[51] Int. Cl.$^2$ ............................................. B29B 1/06
[52] U.S. Cl. ..................................... 366/76; 366/89; 366/181; 425/192 R; 425/812
[58] Field of Search ................... 259/191, 192, 193, 9, 259/10, 97; 264/176, 349, 101, 102, 111; 159/2 E; 425/192 R, 812, 207, 208

[56] References Cited

U.S. PATENT DOCUMENTS

| | | | |
|---|---|---|---|
| 3,023,456 | 3/1962 | Palfey | 159/2 E |
| 3,078,511 | 2/1963 | Street | 259/192 |
| 3,367,635 | 2/1968 | Gresch | 159/2 E |
| 3,764,114 | 10/1973 | Ocker | 259/192 |
| 3,866,890 | 2/1975 | Tadmor | 259/191 |
| 3,979,107 | 9/1976 | Lesk | 259/192 |
| 3,985,348 | 10/1976 | Skidmore | 259/191 |

Primary Examiner—Robert W. Jenkins

Attorney, Agent, or Firm—Bacon & Thomas

[57] ABSTRACT

A vent type extruder devised applicably for effecting extrusion molding of a kind or kinds of resin materials mixed or not mixed with other material at the preset ratio of thirty or more of the effective length of an extruding screw to the diameter thereof, including a plurality of ventages provided on a heating cylinder in open-mouthed relation, tapering faces formed in opposition to each portion of the heating cylinder provided with ventages and the extruding screw, an interspace between these faces being controllably adjusted by operably moving the screw in axial direction thereof, each of venting-casting ports being formed between the ventage and a material feeding port on the heating cylinder in a manner to be changeable of the position wherein the material is to be cast subject to its kind so as to give complete vent to the moisture and gas contained in the material through a single extruding operation and knead the material uniformly in a molten state thereby to provide superior quality of molded articles having a desired shape and free of bubbles.

6 Claims, 14 Drawing Figures

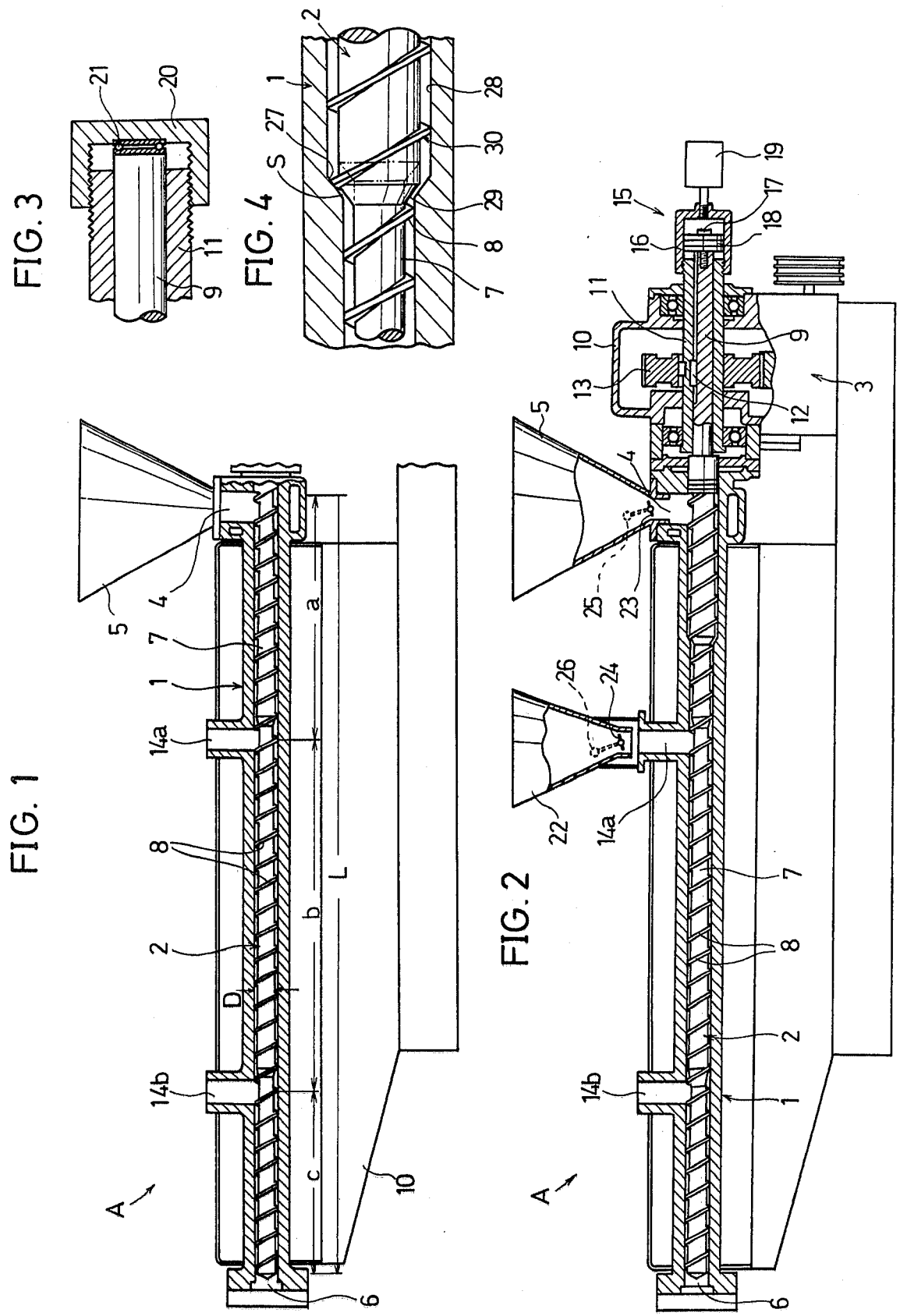

VENT TYPE EXTRUDER

BACKGROUND OF THE INVENTION

The present invention relates generally to improvements in or relating to the so-called "vent type extruder" or more particularly to an improved multi-vents type extruding machine employable to mold any desired shape of articles by extruding a kind or kinds of synthetic resin materials mixed or not mixed with other raw material through the machine.

Most of the aforesaid resin materials and other raw material unexceptionally contain a considerable amount of moisture and gas therein and when they are forced into an extruder to form any desired shape of articles, the questioned amount needs to be given vent from the materials under heating and constrictively extruding treatments. The result is that bubbles are sporadically caused in the inside of thus molded articles, giving rise to inferior quality of the latter.

It is therefore customary with the plastics industry that all the raw materials to be treated for the purpose should be completely dried up prior to the heating and extruding treatments thereby to give vent to the moisture and gas co ntained therein.

In order to save an extra time for the above-mentioned drying treatment, some of the existing extruders are designed to operate without appealing to the desiccating treatment; according to which there is formed a single ventage in open-mouthed relation adjacent to an extruding mouth of a heating cylinder wherein a quantity of moisture and gas contained in completely molten raw materials can be fully discharged.

However, in the initial melting stage, the raw materials are not in a state of giving vent to the moisture and gas contained therein, thus necessitating repetition of extruding operations until the complete venting result can be attained.

Further according to the above-mentioned conventional vent type extruders, an inlet for putting raw materials through is formed into a structurally much simplified single one opening provided with a hopper means through which a variety of resin materials mixed or not mixed with other material must be concentratively put so that when these materials, soft or hard in quality, are promiscuously cast into the hopper means, there is inevitably caused a great difference in melting speed between these qualities, thereby making it practically quite infeasible to obtain fusible mixture of the materials that can be completely mixed or kneaded in a uniforly molten state. Thus there still remains the disadvantage that no high quality articles can be molded through extrusion.

STATEMENT OF OBJECTS

The present invention is concerned with a vent type extruder, and inter alia, with a multi-vents type extruding machine, especially designed with a view to eliminating all the above-mentioned drawbacks and disadvantages, having for one of its main objects the provision of a multi-vents type extruder comprising a heating cylinder provided with a plurality of ventages formed in open-mouthed relation, with the effective length of an extruding screw to the diameter of said screw at the pre-determined ratio of over thirty to one having a range within which resin materials, mixed or not mixed with other raw material and containing a large quantity of moisture and gas, may be completely dried up through a single extruding operation without previously appealing to a desiccating treatment.

Another object of the invention is to provide a multi-vents type extruder including tapering face portions formed in opposed relation to one another between a heating cylinder provided with a plurality of open-mouthed ventages and said extruding screw movably inserted into the inside of the cylinder, with an interspace defined between said tapering face portions being operably adjustable with respect to the axial direction of said extruding screw, whereby both a desired extruding speed and a suitable kneading condition are controllably available subject to the quality of soft or hard resin materials mixed or not mixed with other raw material.

A further object of the invention is to provide a multi-vents type extruder including said heating cylinder provided particularly with a ventage concurrently with a material casting port, or more in brief, a venting-casting port having a hopper means for supplying a fixed quantity of materials, independent of an existing feed port, whereby different kinds of resin materials, mixed or not mixed with other raw material and each having a different melting speed, can be uniformly kneaded merely by changing the positional relation of said venting-casting port.

BRIEF DESCRIPTION OF DRAWINGS

How the foregoing objects and advantages are attained will appear more fully from the following description referring to the accompanying drawings, in which:

FIG. 1 is a vertical cross-sectioned elevational view showing a vent type extruder carrying out a preferred embodiment of the present invention;

FIG. 2 is similarly a vertical cross-sectioned elevational view showing a vent type extruder provided with an extruding screw operably movable along the axis of a heating cylinder;

FIG. 3 is a partially cutaway view showing a modification of a pressure mechanism of FIG. 2;

FIG. 4 is an enlarged cross-sectioned elevational view showing elemental parts of FIG. 2;

DESCRIPTION OF INVENTION IN RELATION TO DRAWINGS

Figure 5:
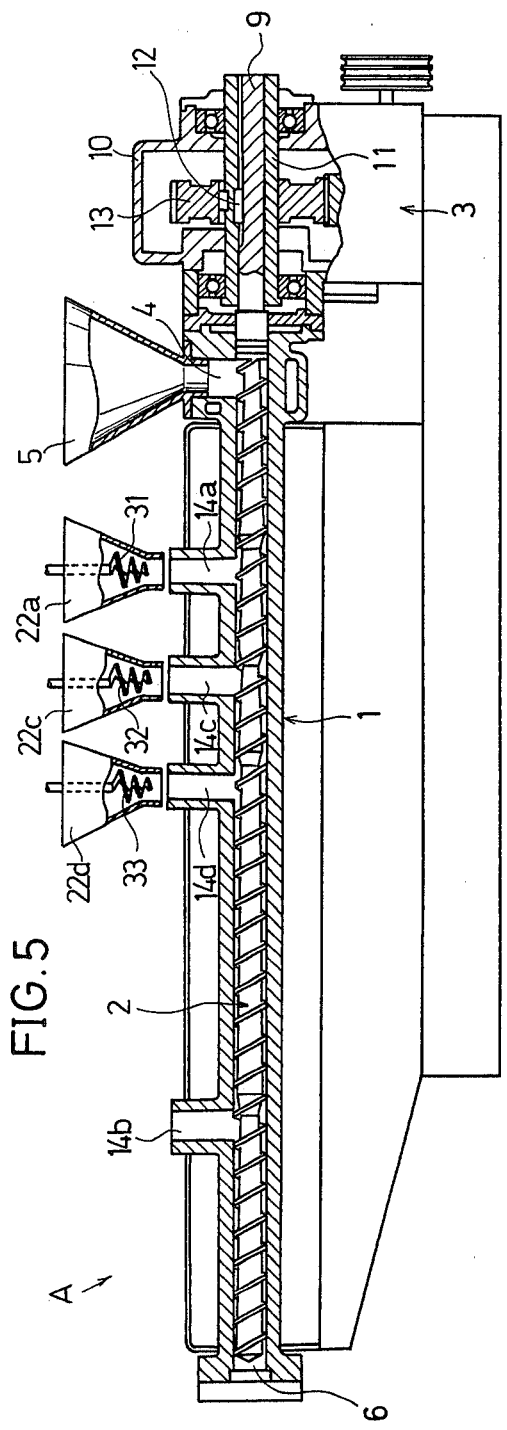
FIG. 5 is a vertical cross-sectioned elevational view showing a multi-vents type extruder provided with three venting-casing ports in selectable relation with respect to the material supplying portion.

Setting forth now in detail a few preferred embodiments of the present invention with reference to the accompanying drawings, reference character A generally designates a vent type extruder of the invention, which comprises a heating cylinder 1 for receiving raw materials and heating the same, an extruding screw 2 for kneading and transferring said materials supplied into the heating cylinder 1, and a driving means 3 for forcibly driving said extruding screw 2.

Said heating cylinder 1 has its upper edge portion formed with a raw material feeding port 4 whereon there is provided a hopper means 5 in communication so as to supply the heating cylinder 1 with a fixed quantity of raw materials. The foremost end of said heating cylinder 1 is formed with an extruding mouth 6.

Said quantity supplied into the cylinder 1 is continuously molten through a die means of the extruder A, to form a desired shape of articles. The extruding screw 21 is composed of screw blades 8 mounted peripherally of a screw shaft 7 in protruded relation therewith, being connected to a driving source such as a torque motor through a transmission gear mechanism.

Within a housing 10 there is rotatably supported a cylindrical spindle 11 to which a non-screwable shaft portion 9 of said extruding screw 2 is connected by means of a key 12 so that the spindle 11 is rotatable together with the screw 2 by a driving force from a motor (not shown in the accompanying drawings) through a gearing 13 mounted integrally with said spindle 11.

In FIG. 1 of the accompanying drawings is illustrated a multi-vents type extruder A (shown herein as being provided with a pair of ventages at a fixedly spaced apart interval axial of upper portion of said heating cylinder 1) wherein the ratio or L/D of the effective length L of said extruding screw 2 to the diameter D of the latter screw 2 is determined to 30 or more so that a first venting zone a defined between the raw material feeding port 4 and a first ventage 14a is adapted to kneadingly melt the supplied quantity of materials to a considerable degree while permitting the moisture and gas to be discharged from the materials; a second venting zone b defined between said first ventage 14a and a second ventage 14b is adapted to melt down said quantity into a completely molten state and force out the whole quantity of moisture and gas from the molten materials under high pressure, and a third venting zone c defined between said second ventage 14b and said extruding mouth 6 being further adapted to completely melt down and knead the whole quantity of materials.

After fed into the heating cylinder 1 through the raw material feeding port 4 from the hopper means 5, a quantity of resin materials mixed or not mixed with other raw material is transferred toward the extruding mouth 6 along with the rotation of the extruding screw 2, during the course of which, the quantity is thermally molten into a mushy state within the first venting zone a and then pass therethrough under pressure. Due to this, if use is made of a mixture of thermoplastic resin and calcium carbonate powder as a raw material to be fed into the multi-vents type extruder A of the invention, the outer surface portion of the resin per se is made nearly molten down while the inner portion remains infusible in a solid state.

In this case, the whole quantity of resin materials is kneaded well together with the particles of infusible calcium carbonate so that each interspace among the particles of the raw material is wide enough to provide an effective ventage and the moisture and gas contained in the materials are thermally vapored and expanded until a certain quantity thereof is discharged from the feeding port 4, while the remnant quantity being discharged through said first ventage 14a. Said plurality of ventages 14a, 14b are formed open on the upper portion of the heating cylinder 1 so as to stop the overflow of the molten materials which otherwise might give rise to the loss of the materials.

The materials forced through the first ventage 14a is fed into said succeeding second ventage 14b to be almost completely smelted therein under pressure. The remnant quantity of moisture and gas contained in the materials, which has been caused posterior to passing through the first venting zone a, is successively heated to be vapored and consequently discharged through the second ventage 14b. Thereafter the material fed into the third venting zone c is kneaded in a completely molten state and finally discharged from the extruding mouth 6 to be formed into a desired shape of articles through said die means.

Incidentally, FIG. 1 shows an embodiment wherein use is made of a pair of ventages 14a and 14b applied to the extruder A of the invention. However, more number of ventages may be applicable thereto, as desired, so as to completely discharge a greater quantity of moisture and gas, if contained, in the materials.

As has already been mentioned in the foregoing, the effective length L of the extruding screw 2 inserted into said cylinder 1 to the diameter D of said screw 2, that is, the ratio (L/D) is preset to 30 or more whereby the material is completely compressed through each of said venting zones a, b and c repeatedly to be given complete vent to the moisture and gas contained in the material through said pair of ventages 14a and 14b, thus bringing about an additional advantage of being very effectively kneaded.

Assuming that the above-mentioned ratio (L/D) be less than 30, more than said pair of ventages provided would never be effective enough to discharge the contained moisture and gas from the material, with the result of making it possible to mold a desired shape of articles having a fine outer surface area and free of bubbles.

The results of our experiments have proved that when said extruding screw 2 is preset to the ratio of more than 30 in so far as said effective length L is to the diameter D, the ratio (L/D) of the aforesaid two vents type extruder A of the invention is recommendable to be set to more than 10 with respect to the first venting zone a, more than 12 with respect to the second venting zone b and more than 8 with respect to the third venting zone c, respectively, so as to totalize more than 30 in correspondence to the foregoing ratio (L/D).

Further it has also been found through the experiments that the ratios (L/D) of said venting zones a, b and c are preferably set to 15, 17 and 8 in turn so that said two vents type extruder A is formed at the total ratio (L/D) of 40 in so far as the effective length L of the extruding screw 2 to the dimater D of the latter is concerned.

According to the two vents extruder A arranged in the abovementioned manner, it is quite possible to completely discharge the whole quantity of moisture and gas contained for example in the raw bead material for formed styrene through a single extruding operation and also reduce the material to formed styrene pellets whereas the conventional single vent type extruders can hardly force out the quantity from said material through as many as two extruding operations.

In the above case, use was made of a conventional single vent type extruder and the two vents type extruder A of the present invention, both being provided with an extruding screw 2 of 100 m/m in diameter D.

In FIG. 2 of the accompanying drawings is shown a vent type extruder A wherein a pair of ventages 14a and 14b are formed open on the heating cylinder 1 similarly to the preceding embodiment and further with the extruding screw 2 operably movable in the axial direction of the heating cylinder 1.

For a fuller understanding, reference numeral 15 in FIG. 2 designates a jackscrew comprising an oil pressure cylinder 16 screwably tightened to the cylindrical spindle 11, a piston 18 rigidly secured to the non-screwable shaft portion 9 of the extruding screw 2 by means of a bolt 17 and a pump 19 communicated to said oil pressure cylinder 16 in a manner to feed an operating oil to the cylinder 16 under pressure so that the piston 18 is forcibly compressed within the oil pressure cylinder 16 by the operation of the pump 19 thereby moving the extruding screw 2 axially of the heating cylinder 1 and also holding the same screw 2 in a desired position.

In this case also, the extruding screw 2 is rotatably driven as is the case with FIG. 1. While said jackscrew 15 is shown as being of an oil pressure type in FIG. 2, it may be of a so-called "screw type" as shown in FIG. 3 wherein a cap 20 is screwably mounted on the outer periphery of said cylindrical spindle 11 and the non-screwable shaft portion 9 of the extruding screw 2 is brought into contact with the inner wall surface of said cap 20 through a thrust bearing 21. Otherwise said jackscrew 15 may be replaceable with any other suitable pressing mechanism wherein the extruding screw 2 is prevented from moving by the reaction of the extruding screw 2 per se against the raw material when the latter is being fed by said screw 2.

According to the above-mentioned vent type extruder A in FIG. 2, said first ventage 14a is provided thereon with a hopper 22 for feeding a fixed quantity of raw material thereby to serve as a venting means concurrently with a feeding mouth, or more in brief, as an auxiliary hopper with respect to the main hopper means 5 for feeding a fixed quantity of raw material provided on the feeding mouth 4.

Said main hopper 5 and said auxiliary hopper 22 are preferably provided in the lower portions thereof with regulating valves 23 and 24, respectively, the movable angles of which are adjustable by means of levers 25 and 26 so as to control a quantity of raw material to be fed.

A portion of the inner periphery of the heating cylinder 1 between the raw material feeding port 4 and the ventage 14a concurrently with a feeding mouth if formed with a fixed tapering surface 27 having an inner diameter which increases toward said raw material feed port 4. Thus the inner diameter of the heating cylinder 1 between this tapering surface 27 and the feeding port 4 is increased thereby forming a large diameter portion 28 of the heating cylinder 1.

In contrast thereto, a portion of the outer periphery of the extruding screw 2 inserted into the heating cylinder 1 in correspondence to said fixed tapering surface 27 is formed with a movable tapering surface 29 having an outer diameter which increases toward the raw material feeding port 4. Thus the diameter of the extruding screw 2 between this movable tapering surface 29 and the raw material feeding port 4 is increased thereby forming a large diameter portion 30 of the extruding screw 2.

In the following, reference will be made to the operation of the vent type extruder A carried out in accordance with the present embodiment. In order to knead a kind or kinds of fusible soft synthetic resin materials, the extruding screw 2 is transferred axially of the heating cylinder 1 by means of the jackscrew 15, as is shown by broken lines in FIG. 4, to enlarge the interspace S between the fixed tapering surface 28 and the movable tapering surface 29, thereafter supplying materials from the main hopper 5 of the feeding port 4. By so doing, the supplied materials are, while being transferred by means of the extruding screw 2, heated in the heating cylinder 1 to turn into a semi-molten state, then being swiftly forced through said interspace S under the minimum resistance. Thereafter, these materials are made to vent their containing moisture and gas through the ventage 14a concurrently with a feeding port, being kneaded by the extruding screw 2, then further discharging their still remnant moisture and gas through the ventage 14b adjacent to the extruding mouth 6, finally to be extruded as a molded article of desired shape swiftly and smoothly.

Further in order to knead a less fusible hard synthetic resin material and a fusible soft synthetic resin material, the extruding screw 2 is transferred by means of the jackscrew 15 to a position shown by a solid line in FIG. 4, to reduce said interspace S. Thereafter, the screw 2 is supplied with the hard resin material from the main hopper 5 and with the soft resin material from the auxiliary hopper 22.

In this case, it is needless to say that each quantity of resin materials to be supplied from the hoppers 5 and 22 should be previously arranged at a desired ratio. As a result of this, the hard resin material is, while being transferred to a position of the ventage 14a by means of the extruding screw 2, heated upto a semi-molten state in the heating cylinder 1 and forced to pass through the reduced interspace S under high pressure which is caused by the resistance of the interspace S against the semi-molten resin material passing therethrough. Thus the fusible soft resin material is forcibly twisted between the tapering surfaces 27 and 29 until the quanitity of less fusible, hard resin material is constrainedly crushed to grains. Thus all the quantity of resin materials, soft and hard, is turned into a semi-molten state and gives complete vent to the moisture and gas contained therein. Thereafter a suitable quantity of soft resin material is added to the semi-molten resin material from the auxiliary hopper 22.

As has been clearly mentioned in the foregoing description, the hard resin material has been turned into a semi-molten state, ready to be completely molten in a mushy state by the time when added soft resin material is completely molten likewise into a mushy state. This has a result that both of the materials soft and hard are well kneaded together by means of the extruding screw 2 in a uniformly molten condition regardless to the difference in melting point between the materials, thus making it possible to be extruded as a compound article of desired shape superior in quality and quite free of interior bubbles.

The same good results as have been mentioned above are obtainable also in case of kneading the resin material with a lumpy additive difficult of diffusion such for example as calcium carbonate or especially with a moisture absorptive material which extremely differs in fusibility from resin material since said interspace S is adapted to be controllably changed between the tapering surfaces 27 and 29 by moving the extruding screw 2 so that the most suitable extruding pressure and velocity can be obtained subject to the fusibility of each raw material which otherwise might be overheated to give rise to qualitative deterioration of finished articles.

In FIGS. 5 to 12 is shown a vent type extruder A that comprises a plurality of ventages formed open on the heating cylinder 1 wherein all the ventages but at least one 14b of them positioned in adjacency to the extruding port 6 are adapted as a vent concurrently with a feeding port which is positionally changeable subject to the kind of raw material to be fed, a hopper means for feeding a fixed quantity of material being provided on each of said vents concurrently with feeding ports or said venting-casting ports 14a, 14c and 14d are formed open on the upper portion of the heating cylinder 1 axially thereof at regularly spaced apart intervals and provided with auxiliary hoppers 22a, 22c and 22d each capable of being selectively communicated to desired one of said venting-casting ports so that the extruder A is able to freely change its position to be supplied with the materials subject to the kind of the material.

By this arrangement of the extruder A, compound raw materials can be completely kneaded in a uniformly molten state irrespective of their difference in fusibility and melting rate, with an advantageous effect that all the quantity of moisture and gas contained in the materials is forcibly discharged therefrom.

The operational function of the vent type extruder A in accordance with the present embodiment is as in the following: The venting-casting ports 14a, 14c and 14d as shown in FIG.5 may be provided with screwably thrusting means 31, 32 and 33, respectively, to be driven by means of a suitable driving mechanism (not shown in the accompanying drawings) whereby raw material light in weight such as smashed pieces of reclaimed resin sheets can be advantageously thrusted into the heating cylinder 1.

In order to provide molded articles of compound materials by kneading a hard, less fusible resin material and a soft, fusible resin material, each casting position of the materials is selectively determined subject to the melting speed and fusibility of the materials whereby the hard, less fusible resin material is cast into the heating cylinder 1 from the main hopper 5 whereas the soft, fusible resin material having an extreme difference in melting speed from said hard material is cast into the cylinder 1 from the third auxiliary hopper 22. Meanwhile the soft resin material having a small dofference in melting speed from said hard one is cast from the first auxiliary hopper 22a, and the soft resin material having an intermediate degree of melting difference from said hard one is cast from the second auxiliary hopper 22c.

Supposing now the soft resin material is cast into the heating cylinder 1 through the second venting-casting port 14c from the second auxiliary hopper 22c while a desired mixing rate is preset for the raw materials to be supplied into the main hopper 5 and the auxiliary hopper 22c, respectively, the hard, less fusible resin material cast into the feeding port 4 is transferred toward the extruding mouth 6 by means of the extruding screw 2 and heated within the heating cylinder 1 during the course of this transferrnce, to be turned into a semi-molten state and finally deprived of the contained moisture and gas through the first venting-casting port 14a.

At this stage a certain quantity of said hard resin material still remains solid having so large interspaces among particles of this quantity that all the quantity of the material can be very effectively deprived of the contained moisture and gas.

The soft, fusible resin material supplied through said second venting-casting port 14c is added to said hard resin material that was supplied from the feeding port 4 and has now been half molten so that these materials are kneaded together, transferred by means of the extruding screw 2 and at the same time heated to be integrally half molten, thereafter being deprived of the contained moisture and gas from the third venting-casting port 14d when passing therethrough.

In this case, a certain quantity of said hard resin material still remains solid to result in being effectively deprived of the contained moisture and gas. Further the soft resin material is molten almost simultaneously a certain quantity of said hard resin material has begun being molten so that both the materials are fully kneaded together in a uniformly molten condition without causing sporadically unbalanced mixing ratios, while the venting operation is effected through the ventage 14b adjacent to the extruding mouth 6.

This is also the case with the kneading operation of resin material with an additive different in specific gravity such for example as calcium carbonate, wherein a fixed quantity of resin material is supplied from said main hopper 5 of the feeding port 4 while the additive quantitatively corresponding to its difference in specific gravity from said material is cast at a desired mixing ratio into selected one of the auxiliary hoppers 22a, 22c and 22d through one of the venting-casting ports 14a, 14c and 14d corresponding to said selected hopper.

Though the above-mentioned vent type extruder A as definitely shown in FIG. 5 is such that the venting-casing ports 14a, 14c and 14d are formed integrally with the heating cylinder 1 and a fixed quantity of raw material is cast into the cylinder 1 in positionally changeable relation with respect thereto through selected one of the auxiliary hoppers 22a, 22c and 22d corresponding to one of said venting-casting ports, yet a modification of said extruder A may be made, as shown in FIGS. 6 to 12, by forming the venting-casting port 14a into a cylindrical shape and detachably mounting the thus formed cylindrical port 14a to the heating cylinder 1 in axially movable relation therewith so as to make it possible to selectively change the position of the heating cylinder 1 wherein the raw material is to be cast.

Figure 6:
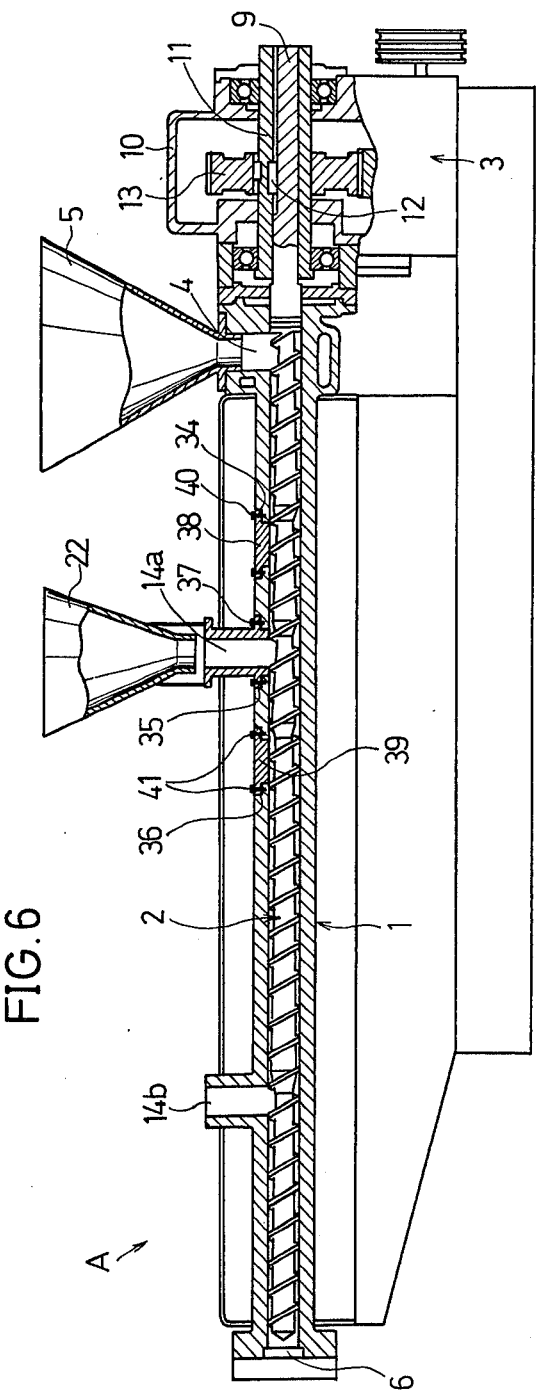
FIG. 6 is similarly a vertical cross-sectioned elevational view showing a vent type extruder provided with a single venting-casting port movable axially of said heating cylinder.
Figure 7:
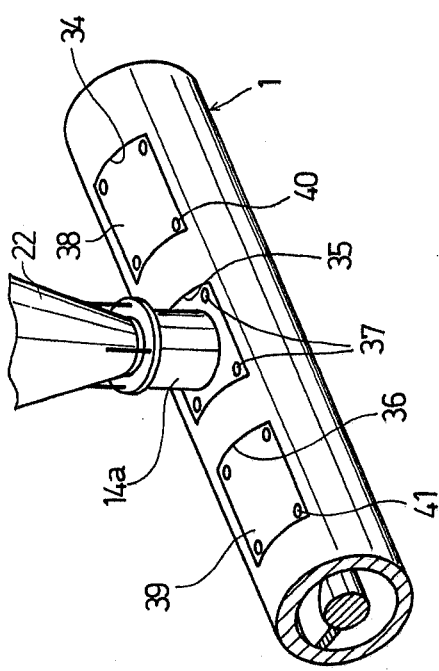
FIG. 7 is a perspective view showing elemental parts of FIG. 6.
Figure 8:
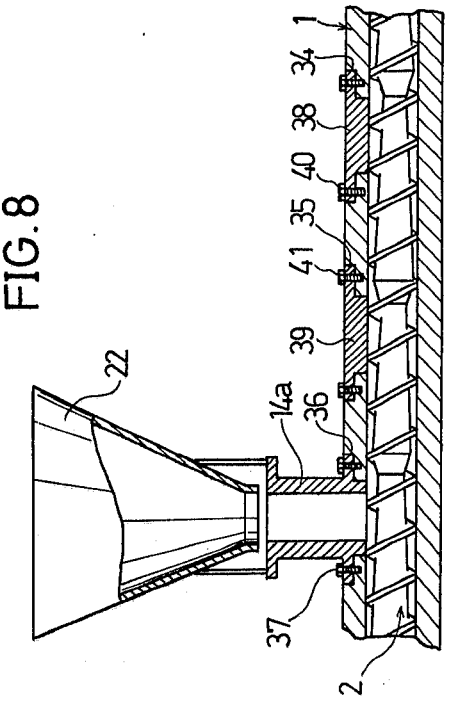
FIG. 8 is an enlarged cross-sectioned elevational view illustrating elemental parts of the venting-casting port.

Referring now to the vent type extruder A as shown in FIGS. 6 to 8 in connection with the preceding modification, the heating cylinder 1 is provided thereon with a plurality of apertures (or three apertures 34, 35 and 36 in the drawings) bored through axially thereof at regularly spaced part intervals. Said single cylindrical venting-casting port 14a is insertible into any selected one of these apertures and detachably secured thereto by means of a bolt 37.

Especially in FIGS. 6 and 7 is shown the cylindrical venting-casting port 14a secured to the aperture 35 with the other apertures 34 and 36 left open-mouthed. Therefore the apertures 34 and 36 are stopped up with plugs 38 and 39 fixed by means of fixing bolts 40, 41 thereby to prevent the supplied raw materials from being forced out through the apertures.

Both the venting-casting port 14a and each plug 38, 39 are replaceable with each other, and similarly the fixing bolts 40, 41 for said plugs 38, 39 and the bolt 37 for the cylindrical venting-casting port 14a are also replaceable with each other whereby said port 14a is mountable to selected one of three apertures 34, 35 and 36.

Figure 9:
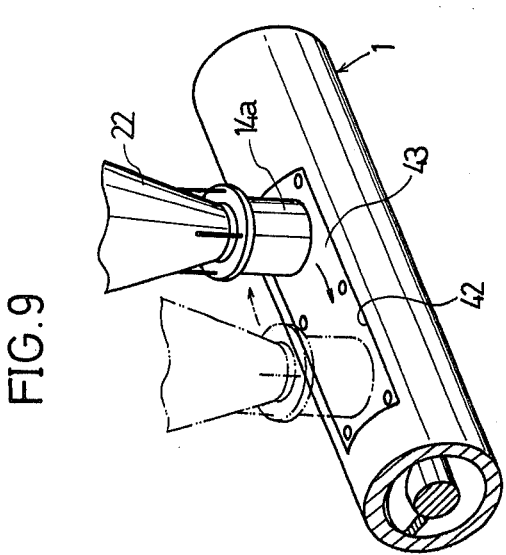
FIG. 9 is a perspective view showing elemental parts of the first modification of FIG. 6.
Figure 10:
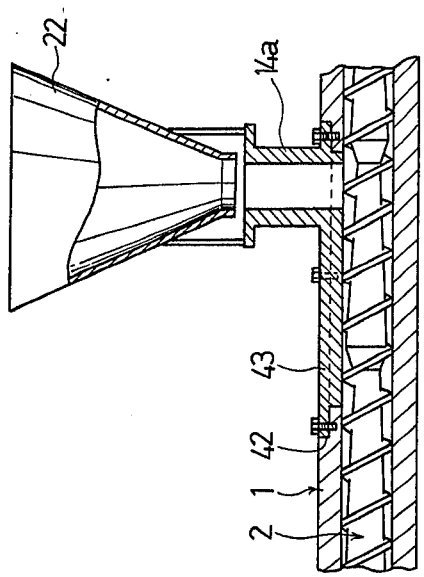
FIG. 10 is an enlarged cross-sectioned elevational view of FIG. 9.

In FIGS. 9 and 10, reference numeral 42 denotes a slit formed on the heating cylinder 1 between the feeding port 4 and a ventage 14b. Said slit 42 is dismountably covered with a covering 43. The single venting-casting port 14a is integrally mounted on said covering 43 in its eccentric position axial of the heating cylinder 1. Said covering 43 is changeable of its positional direction to still serve as a covering means for the slit 42. Thus by changing the direction of the covering 43 and fixing the latter on the slit 43, the venting-casting port 14a can change its position axially of the heating cylinder 1.

Figure 11:
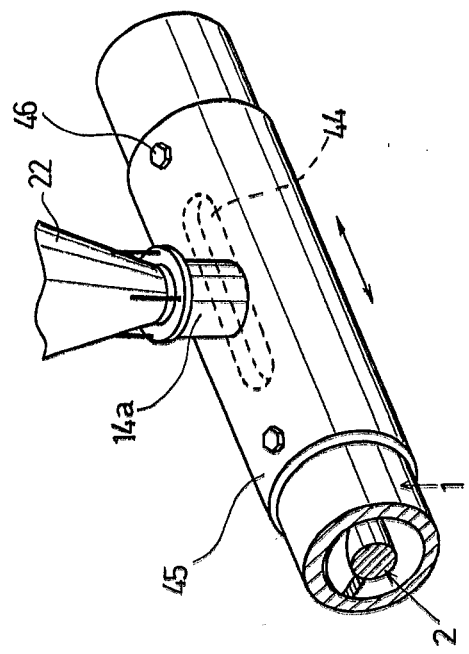
FIG. 11 is likewise a perspective view showing elemental parts of a second modification of FIG. 6.
Figure 12:
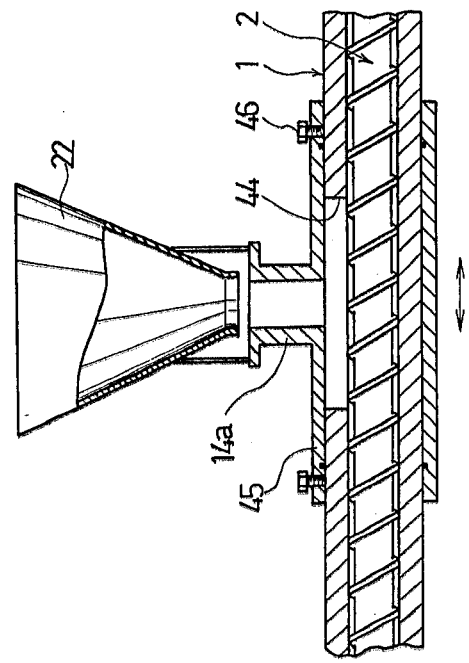
FIG. 12 is an enlarged cross-sectioned elevational view of FIG. 11.

In FIGS. 11 and 12, numeral 44 denotes a slit formed similarly on the heating cylinder 1. Said slit 44 is covered with a cylindrical covering 45 slidably mounted on the cylinder 1 and formed integrally with a single venting-casting 14a. In the present embodiment, said venting-casting port 14a can change its position by sliding the cylindrical covering 45 in the axial direction of the heating cylinder 1 with said slit 44 covered with the covering 45 and then fixing the changed position of the port 14a to a fixing bolt 46.

As has been clearly mentioned above in connection with FIGS. 6 to 12, the cylindrical venting-casting port 14a is also selectively changeable. The extruding molding and venting operation of the present embodiment are practically same as shown in FIG. 5 and therefore detailed description thereof will be omitted.

Figure 13:
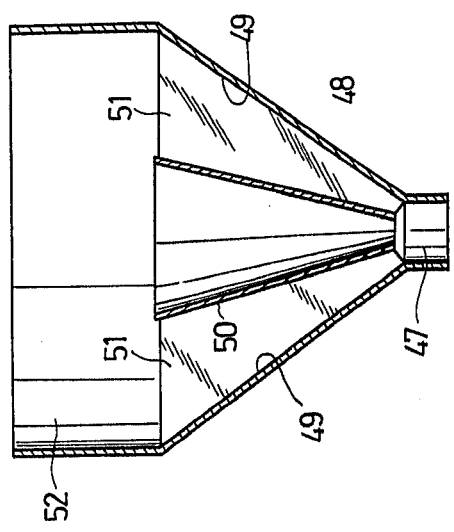
FIG. 13 is an enlarged cross-sectioned elevational view of a hopper means adapted for a vent type extruder of FIG. 12.
Figure 14:
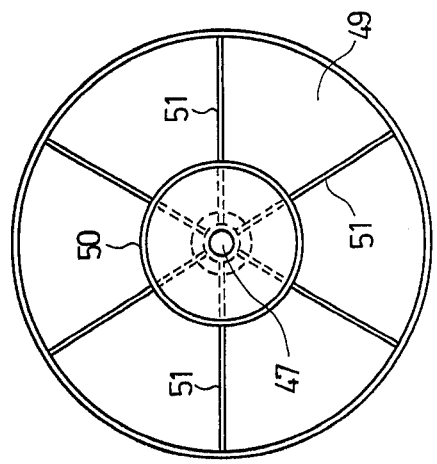
FIG. 14 is a top plan view thereof.

In FIGS. 13 to 14 is shown the construction of the most suitable hopper means for supplying such a raw material as particulates or a mixture thereof and applicable in place of the main hopper 5 and the auxiliary hoppers 22a, 22c and 22d of said venting-casting ports 14a, 14c and 14d, wherein said hopper means comprises a lowermost outlet 47 and a cone-shaped hopper portion 48 communicated to said outlet 47. Said portion 48 is provided centrally in its inner space 49 with a trumpet-shaped partition 50 whose inner diameter is reduced toward the lowermost end thereof.

Between the outer periphery of said partition 50 and the inner periphery of said hopper portion 48 there are provided a plurality of plane partitions 51 (six partitions provided radially in the accompanying drawings) at regularly spaced apart intervals circumferential of the hopper portion 48.

According to the above-mentioned construction of the hopper means, the inner space of the hopper portion 48 is divided into a plurality of passageways for raw materials by means of the trumpet-shaped partition 50 and the plane partitions 51 whereby the raw material such for example as pellet-shaped resin material cast into the hopper means is smoothly dropped to the lowermost outlet 47 through the passageways of the hopper portion 48 from an uppermost opening 52.

In this case, each quantity of the material passing through said plurality of passageways has only to be burdened with a load of material accumulated in the upper portion of each passageway and the amount of material running through the lower portion of the passageway is not subjected to great pressure so that a fixed quantity of material is permitted at all times to drop from the outlet 47 without forcibly pressing the inner walls of each passageway and bringing about bridge formation in the outlet 47.

Furthermore when a mixture of raw materials different in kind is cast into the hopper means, the mixture is almost uniformly distributed among the passageways so as to be divided into approx. equally small quantities of said mixture whereby said each small quantity is let to pass through each passageway without being somewhat replaced with said quantities supplied into contiguous passageways, the result being that the mixed ratio of the materials is kept intact.

Though a few specific embodiments of the present invention has been shown and described herein, it will be apparent to those skilled in the art that the invention is not restricted to the details set forth but many changes and modifications may be made without departing from the spirit and scope of the invention as defined in the annexed claims.

What is claimed is:

1. A vent type extruder comprising a raw material feeding port in a heating cylinder and provided on the uppermost edge portion thereof with a hopper means, said heating cylinder being provided in the foremost end thereof with an extruding mouth, a rotatable extruding screw in said heating cylinder, and means defining a vent on said heating cylinder adjacent to said extruding screw and venting-casting port means in a portion of said cylinder positioned between said vent and said raw material feeding port, said venting-casting port means being positioned and arranged on said cylinder whereby additional material may be introduced into said cylinder at selected positions axially thereof, depending upon the kind of materials to be cast into the cylinder, said venting-casting port being provided on the upper portion thereof with auxiliary hopper means.

2. The vent type extruder, as set forth in claim 1, wherein said venting-casting port means comprise plural ports provided on said heating cylinder at regularly spaced part intervals along the axis of the cylinder whereby any selected one of said venting-casting ports may be used selectively to introduce raw materials to be cast into the cylinder.

3. The vent type extruder, as set forth in claim 1, wherein said venting-casting port means comprises a plurality of apertures coverable with independent covering means formed on said heating cylinder at regularly spaced apart intervals along the axis of the cylinder, each of said apertures being arranged to selectively receive said auxiliary hopper means to permit the latter to be moved axially of the cylinder and thereby selectively change the positional relation of said port with respect to said heating cylinder subject to the kinds of raw materials to be cast into the cylinder.

4. The vent type extruder, as set forth in claim 1, wherein said heating cylinder is formed with an axial slit and said venting-casting port comprises a reversible cover for said slit with a port in an eccentric position on said cover, said cover being reversible with respect to the cylinder to place said port at different axial positions.

5. The vent type extruder, as set forth in claim 1, wherein said venting-casting port means comprises an axial slit in said cylinder and a cylindrical covering means slidably mounted on the cylinder, said auxiliary hopper communicating with a port in said cylindrical covering means in communication with said slit so that said port is movable axially of the cylinder by slidably moving said covering means.

6. The vent type extruder, as set forth in claim 1, wherein partitions are provided in the inside of said main hopper means thereby to divide the inner space of said hopper into a plurality of passageways for letting equally divided quantities of raw material to pass through.

* * * * *